(12) United States Patent
Lang

(10) Patent No.: US 6,226,888 B1
(45) Date of Patent: May 8, 2001

(54) METHOD AND DEVICE FOR DRYING A GAS

(75) Inventor: Kristian Karl Henrik Lang, Waterloo (BE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 0 days.

(21) Appl. No.: 09/455,252

(22) Filed: Dec. 6, 1999

(30) Foreign Application Priority Data

Dec. 14, 1998 (EP) .................................................. 98204242

(51) Int. Cl.⁷ ....................................................... F26B 3/00
(52) U.S. Cl. .................. 34/332; 34/358; 34/473; 34/491; 34/71; 34/80; 55/270; 55/275; 95/120; 95/121; 95/126; 96/145; 96/144
(58) Field of Search ............................... 34/332, 358, 472, 34/473, 491, 69, 71, 80, 81; 96/134, 136, 143, 144; 95/117, 120, 121, 126; 55/270, 275

(56) References Cited

U.S. PATENT DOCUMENTS

| 4,127,395 | 11/1978 | McKey et al. . |
| 4,971,610 | * 11/1990 | Henderson ............................... 96/111 |
| 5,123,277 | * 6/1992 | Gray et al. ............................ 73/29.01 |
| 5,485,686 | 1/1996 | Sears, Jr. . |
| 5,581,903 | 12/1996 | Botich . |

FOREIGN PATENT DOCUMENTS 0 100107    2/1984   (EP) .

* cited by examiner

Primary Examiner—Pamela Wilson
(74) Attorney, Agent, or Firm—Bacon & Thomas, PLLC

(57) ABSTRACT

A method and device for drying a gas by means of adsorption on a desiccant able to be regenerated (11), whereby a portion of the dried gas is used for regenerating the desiccant. The gas portion used for the regeneration is heated in at least two successive steps, said steps being performed in different zones (30,31 or 33–36) situated successively in the flow direction of the gas portion through the regenerating desiccant (11) and by stopping the heating in a zone (30,31 or 33–36) as soon as the desiccant (11) in this zone (30,31 or 33–36) is regenerated, so that this zone (30,31 or 33–36) may already cool down by the gas portion for regeneration while a successive zone (30,31 or 33–36) is still regenerated by the heated gas. In each vessel (7, 8) at least two individually controllable heating elements (25–26; 27–28; 38–41) are present.

9 Claims, 2 Drawing Sheets

METHOD AND DEVICE FOR DRYING A GAS

BACKGROUND OF THE INVENTION

1. Field of the Invention

This invention relates to a method for drying a gas by means of adsorption on a desiccant able to be regenerated, according to which method a gas is sent through a first amount of this desiccant, while a portion of the dried gas is sent through a second amount of already used desiccant for regenerating it, this gas portion for the regeneration being heated and after having taken up moisture is evacuated, whereby, after regenerating the second amount of desiccant, the gas flow is inverted so that the gas to be dried is sent through the regenerated second amount of desiccant, while a portion of the dried gas is now sent through the first amount for regenerating.

2. Discussion of the Related art

Methods of this kind are used amongst others for drying compressed gas, mostly compressed air. The compressed gas leaving the compressor has a relatively high moisture content. Part of the moisture is separated by cooling this air. The remaining moisture may be disadvantageous for the conducts and is undesirable for some applications.

A known method of this kind is disclosed amongst others in EP-A-0.419.433. The compressed air to be dried is dried in a first column, while the wet desiccant is regenerated in a second column by a portion of the dried compressed air. This portion is introduced, at half-height of the column, in the lower end of a tube mounted axially in the column and containing an electrical heating element. The gas is heated in the tube and flows in the wet desiccant at the top of the column, flows downward and leaves, charged with moisture, the column at the bottom.

It is evident that this heated gas causes a heating of the desiccant. Heated desiccant is however less effective than cold desiccant and therefore the regenerated desiccant is normally cooled before being used again for drying. If the desiccant is too hot when it is used for drying, a regeneration will start instead of drying. Cooling is also necessary to avoid dew point pikes during drying.

In said known method, this cooling is obtained by turning off the electrical heating while a portion of the dried compressed air is still sent through the desiccant.

In this way, the cooling can only take place after the complete regeneration of the desiccant and consequently the complete regeneration and cooling process is time-consuming. Moreover, an additional amount of already dried air is required for the cooling and is lost for consumption. This increases the energy consumption.

SUMMARY OF THE INVENTION

The invention seeks to provide a method for drying a gas avoiding said disadvantages and permitting to minimalize the energy consumption for regenerating the desiccant.

In accordance with the invention, this object is accomplished by heating the gas portion used for the regeneration in at least two successive steps, said steps being performed in different zones situated successively in the flow direction of the gas portion through the regenerating desiccant and by stopping the heating in a zone as soon as the desiccant in this zone is regenerated, so that this zone may already cool down by the gas portion for regeneration while a successive zone is still regenerated by the heated gas.

It is obvious that the first zone to be regenerated will be the zone where the gas portion for regeneration is entered as this gas portion has not yet taken up much moisture.

This is especially the case if the gas portion for regeneration is sent through an amount of desiccant in the opposite direction as the gas to be dried was sent when this amount was used for drying.

In this case said first zone is the zone which has taken up the less of moisture during drying.

The number of heating steps and consequently zones during regeneration may be higher than two.

Heating of the zones of the amount of desiccant which is regenerated may be performed in several ways, for example by electrical heating elements, but a very effective way of heating is by means of microwaves.

The invention also relates to a device which is especially suitable for applying the method according to either one of the preceding embodiments.

The invention concerns consequently a device for drying gas by adsorption, comprising an inlet pipe for the wet gas, an outlet pipe for the dried gas en between them at least two vessels mounted in parallel filled with a desiccant able to be regenerated, means for connecting the inlet pipe alternately with the inlet of one of the vessels and the inlet of the other vessel for drying the wet gas, means for returning a portion of the dried gas to the vessel which is not connected to the inlet pipe, for the regeneration of the desiccant and heating means in both vessels, said heating means comprising at least two heating elements which are situated successively in different zones in the flow direction of the gas through the vessel and which can be switched in or off separately, characterized in that the device comprises means for measuring directly or indirectly the moisture content in each zone and a control device connected to said means for commanding the heating elements individually in function of the moisture contents measured by said means.

Further prior art

U.S. Pat. No. 5,485,686 discloses a drying device with two vessels filled with desiccant able to be regenerated, a two heater coils being mounted in each vessel, one above the other. Only the bottom heater coil is switched on in a vessel when the air is dried therein, for heating the dried air to the optimal temperature for the use of the air, this is the drying of thermoplastics. During regeneration of the desiccant in a vessel, both heater coils are switched on.

According to the invention, preferably, the heating elements are microwave sources.

BRIEF DESCRIPTION OF THE DRAWINGS

The invention will now be described by way of example and with reference to the accompanying drawings in which.

DESCRIPTION OF PREFERRED EMBODIMENTS

Figure 1:
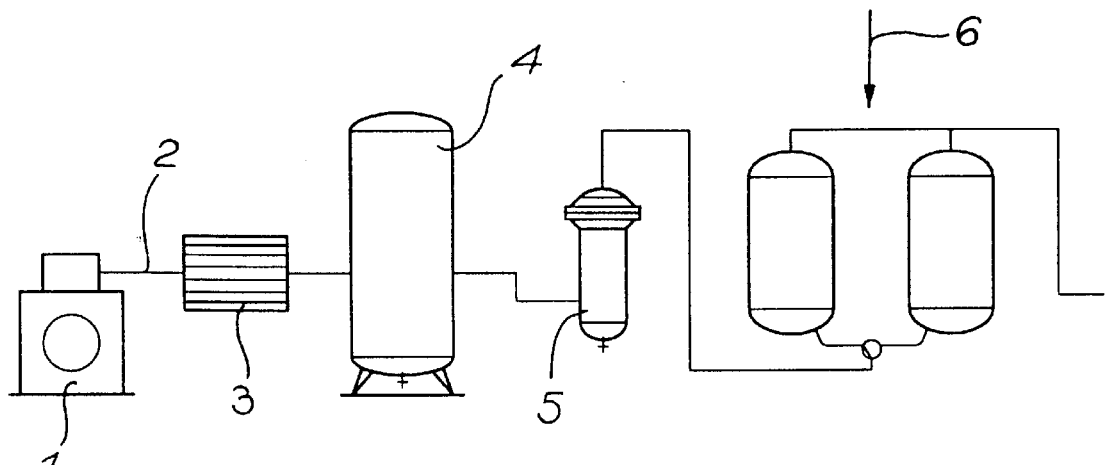
FIG. 1 shows schematically a compressor installation possessing a device for drying gas according to the invention.

FIG. 1 shows a compressor installation which comprises essentially a compressor 1 and in the compressed air conduit 2 of it successively an after cooler 3, a pressure vessel 4, an oil separator 5 and a drying device formed by an adsorption dryer 6.

Figure 2:
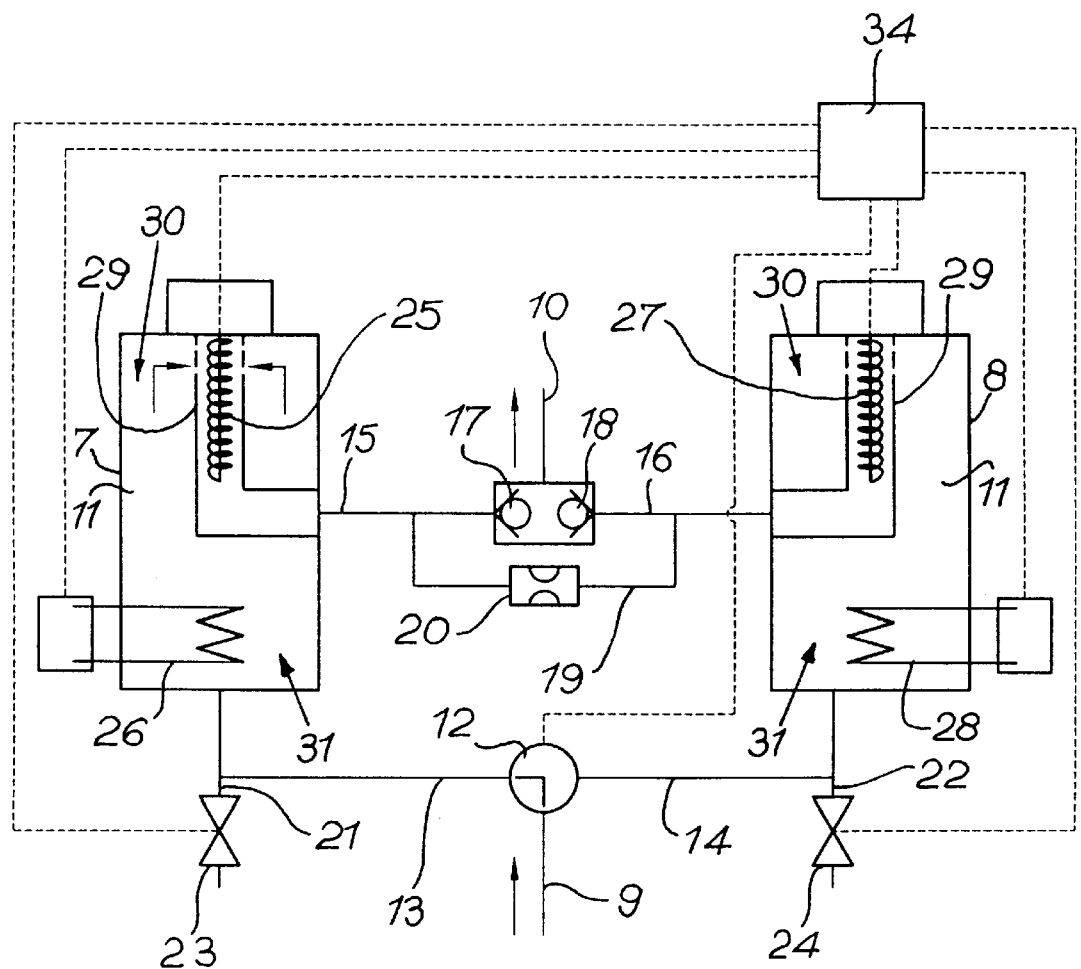
FIG. 2 shows schematically the device for drying gas from the installation of FIG. 1.

As shown more in detail in FIG. 2, this adsorption dryer 6 comprises two columns or upstanding vessels 7 and 8 which are mounted in parallel between the inlet pipe 9 and an outlet pipe 10 and which are filled with a desiccant 11, for example silica-gel.

The inlet pipe 9 consists of the portion situated before the vessels 7 and 8 of the compressed air conduit 2 and is connected by means of a first pneumatically controlled three-way valve 12 and one of two conduits 13 and 14 connected thereto, with respectively the vessel 7 or the vessel 8.

The outlet pipe 10 consists of the portion situated after the vessels 7 and 8 of the compressed air conduit 2 and is connected by means of two conduits 15 and 16 with respectively the vessels 7 and 8.

In the conduit 15 a non-return valve 17 is mounted while in the conduit 16 a non-return valve 18 is mounted. Both non-return valves 17 and 18 prevent the gas to return to the vessel 7 or 8.

In a variant, the two non-return valves 17 and 18 may be replaced by a single three-way valve.

Both non-return valves 17 and 18 are shunted by a conduit 19 containing a throttle valve 20.

To conduits 13 and 14 is connected an air outlet pipe 21 or 22 which can be closed by a pneumatically controlled valve 23 or 24.

In each of the vessels 7 and 8, heating means are mounted which each consist of a number, in the given example two, heating elements distributed over the height of the vessels in different zones.

Vessel 7 contains thus two heating elements 25 and 26, more particularly electrical resistances, while vessel 8 contains two heating elements 27 and 28, more particularly electrical resistances.

The uppermost heating elements 25 and 27 are mounted inside an axially extending tube 29 which is perforated at the top of the vessel 7 or 8 and which is connected with its lower end, approximately at half-height of the vessel 7 or 8, with the conduit 15 or 16.

The tube 29 opens with its perforations on the upper zone 30 of the vessel 7 or 8.

The heating elements 26 and 28 are situated in the desiccant 11 in the lower zone 31 of the vessel 7 or 8.

Direct contact of the heating elements 26 and 28 with the desiccant 11 is preferably avoided, particularly when these heating elements 26 and 28 are electrical resistances, in order to prevent hot spots in the desiccant. The wire of the resistances may therefore for example be surrounded with a heat-dissipating material.

The heating elements 25, 26, 27 and 28 may be individually switched on or off by means of a control device 34.

Both non-return valves 17 and 18 are shunted together by a conduit 32 which can be closed by a valve 33 also controllable by said control device 34.

Said control device 34 also controls the pneumatically controlled valves 23 and 24 and the three-way valve 12.

The above-mentioned device operates as follows:

The compressed air produced by the compressor 1 is cooled in the after cooler 3 and accumulated in the pressure vessel 4 where it is further cooled. As a result, part of the moisture in the compressed air will compensate. The condensate is separated in a manner not shown in the FIG. 1.

After separation of the oil in the oil separator 5, the compressed air enters via the inlet pipe 9 in the adsorption dryer 6.

When the three-way valve 12 is in the position shown in FIG. 2, the compressed air enters via the conduit 13 in the vessel 7 where remaining moisture of the air is adsorbed in the desiccant 11.

The heating elements 25 and 26 are switched off and the valve 23 is closed.

The dried air leaves the vessel 7 through the tube 29 and the conduit 15 and reaches through the non-return valve 17 the outlet pipe 10. The non-return valve 18 prevents the air to enter the conduit 16.

A small portion, for instance 3 to 8 vol. % of the dried air, however, reaches the conduit 16 through the shunt conduit 19, as far as the desiccant 11 in vessel 8 has already been used for drying and is saturated with moisture.

This portion of the dried air expands in the tube 29 in the vessel 8. The heating elements 27 and 28 are switched on by the control device 34 and the valve 24 is opened.

The air portion is first heated by the heating element 27 up to a temperature between 120 to 250° C., enters the upper zone 30 and flows downwards through the desiccant 11. This portion of air is further heated by the heating element 28 in the lower zone 31.

Due to the heated air, the desiccant 11 in the vessel 8 is regenerated. The heating element 28 prevents condensation of the moisture with which the air portion has been saturated in the zone 30 and permits taking up of more moisture by the air because of its higher temperature.

The regenerating air charged with moisture is evacuated through the outlet pipe 22 in which the valve 24 is open.

The air portion for regenerating will first take up moisture from top. The dryer the top, the more the air can take up moisture from a lower layer of desiccant 11. The desiccant 11 in the upper zone 30 will be dry and thus regenerated before the desiccant 11 in the lower zone 31.

This is the more the fact that, as during drying with the desiccant 11, the wet air flows from bottom to top, the desiccant 11 in the lower zone 31 contains more moisture than the desiccant 11 in the upper zone 30 when the regeneration starts.

After a certain time, namely when the desiccant 11 in the upper zone 30 is expected to be dry, or preferably after a sensor measuring the degree of moisture in this zone 30 shows that the desiccant 11 in this zone 30 is dry, the control device 34 switches off the heating element 27.

This moisture content may be measured indirectly by measuring the temperature. When the temperature of the air at the lower end of zone 30 reaches its maximum situated between 150 and 200° C., there is no water to be taken up from the desiccant 11 in this zone 30.

This means that the air portion for the regeneration cools the desiccant 11 in the upper zone 30 which was previously heated, while the air in the lower zone 31 is still heated by the heating element 28 and still dries the desiccant 11 in this zone 31.

When also the desiccant 11 in this zone 31 is dry, which can be detected by measuring the temperature at the outlet of zone 31, the control device 34 switches off the heating element 28 and the zone 31 is cooled. Finally the valve 24 is closed.

When the desiccant 11 in the vessel 7 is no longer effective and must be regenerated, the control device 34 changes the position of the three-way valve 12 so that the pipe 9 is now connected with the conduit 13. The regenerated desiccant 11 in the vessel 8 is now used for drying, while the desiccant 11 in the vessel 7 is regenerated in exactly the same manner as described herebefore for the desiccant 11 in the vessel 8. At the start of the regeneration, the valve 23 is opened so that the pressure can be relieved from the vessel 7 and the regeneration may be performed at ambient pressure.

As at the end of the regeneration, the upper zone 30 is already cooled while the lower zone 31 is still being regenerated, the total cooling time of the regenerated desiccant 11 is shortened.

This permits to use a smaller quantity of desiccant 11 in each vessel 7 and 8 and a smaller vessel. Moreover, the radiation heat losses from the regenerating vessel are smaller and the energy consumption is lower.

It is obvious that the number of zones 30 and 31 and thus the number of heating elements 25,26 or 27,28 in each vessel 7 or 8 may be more than two. Also other heating means than electric heating elements may be used as well.

Figure 3:
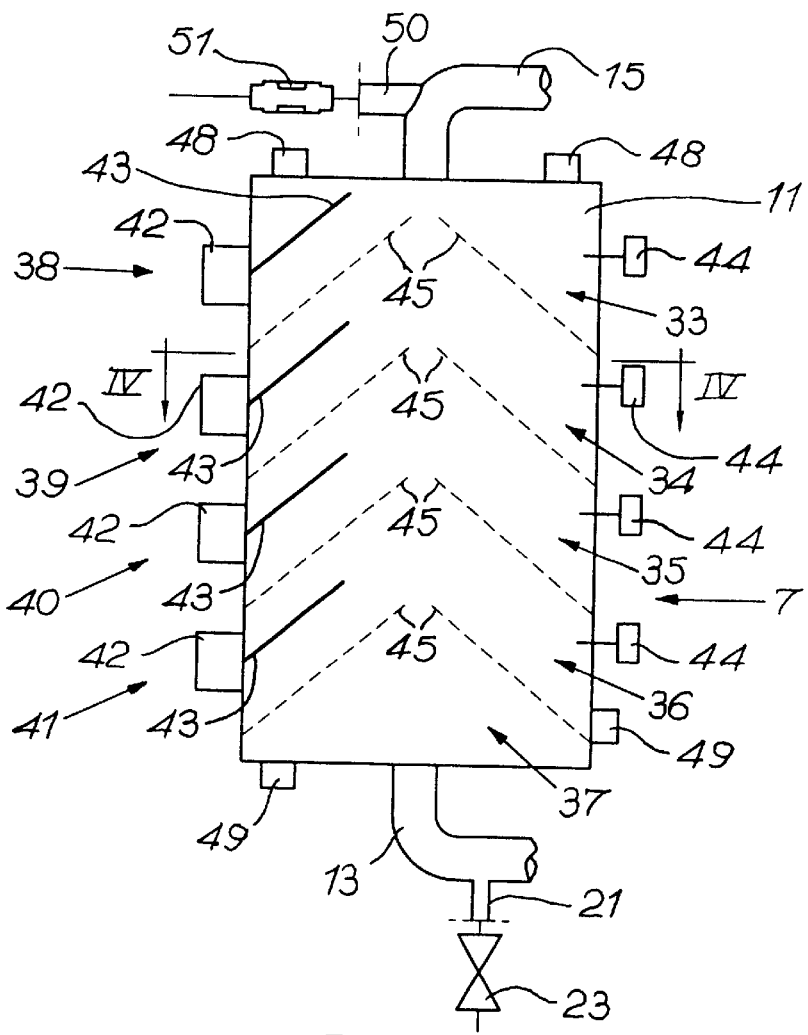
FIG. 3 shows a part of the device of FIG. 2, but on a larger scale and with respect to another embodiment of the invention.
Figure 4:
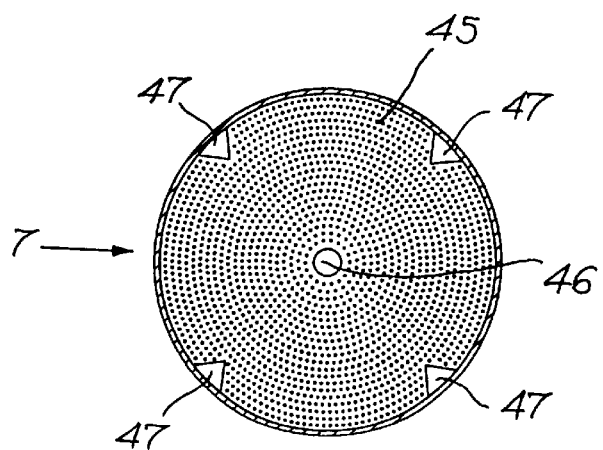
FIG. 4 is a cross-section according to line IV—IV in FIG. 3.

In FIGS. 3 and 4 another embodiment of the adsorption dryer 6 is shown, whereby this dryer 6 only differs from the above described dryer 6 in that the vessels 7 and 8 are different in construction, more precisely in that these vessels 7 and 8 are divided in five zones 33, 34, 35, 36 and 37, four of which can be heated individually by means of a microwave heat source 38, 39, 40 or 41.

Only a part of the dryer 6 comprising the vessel 7 has been shown, but the vessel 8 is identical.

Each microwave heat source 38 to 41 consists of a generator 42 mounted on the outside of the vessel 7 and an antenna 43 extending inside one of the zones 33 to 36 to be heated. The lowermost zone 37 is not provided with heating means.

Each zone 33 to 36 contains also a sensor 44 detecting the moisture content in the zone and connected via the control device 34 with the generator 42 of the microwave heat source 38, 39, 40 or 41 pertaining to this zone.

The zones 33 to 37 are separated from each other by metallic perforated screens 45 restraining the microwaves emitted by a heat source 38 to 41 within the corresponding zone. The screens 45 are for instance from stainless steel.

The perforations of the screens 45 have for instance a diameter of about 1 mm while the desiccant particles are beads with a diameter between 2 and 5 mm, so that the screens 45 not only retain the microwaves but also the desiccant 11.

The screens 45 are conical in order to distribute the desiccant 11 over the whole diameter of the vessel 7 and to obtain a filling of the desiccant 11 without pockets.

In order to permit filling and emptying the vessel 7 with desiccant 11, the screens 45 are provided with an opening 46 at their top, for instance a round opening 46 with a diameter of about 2 cm, and a number of slots 47 at their lower edge, for instance four triangular slots 47.

Moreover, the vessel 7 is provided with two filling plugs 48 at its top and two emptying plugs 49 at its bottom.

A purge pipe 50 with a purge air nozzle 51 is connected to the conduit 15.

The drying device operates in the same way as described herebefore except that during the regeneration of the desiccant 11, the heating of the air portion for the regeneration takes successively place in four zones 33 to 36 by microwaves, whereby as soon as a sensor 44 detects that the desiccant 11 in its zone is dry, the microwave generator 42 heating this zone is shut off.

The zones 33 to 36 will successively from top to bottom be dry and consequently no longer heated but cooled by the air portion for the regenerating.

Filling with desiccant 11 takes place by opening the filling plugs 48 and pouring desiccant 11 in the vessel 7. The desiccant 11 falls through the slots 47 and the opening 46 of a screen 45 and fills up each zone 33 to 37.

Emptying for replacing the desiccant 11 occurs by removing the emptying plugs 49, whereby the desiccant 11 falls down through the openings 46 and slots 47.

In the described embodiments, during the regeneration of the desiccant 11 in a vessel 7 or 8, the gas flows from top to bottom in this vessel. It is obvious that the invention is also applicable with an inverted gas flow, where the gas flows from bottom to top.

The heating in the zones will then be stopped successively from bottom to top. The heating of the bottom zone will be stopped while the zone above is still heated.

What is claimed is:

1. A method for drying a gas by means of adsorption on a desiccant able to be regenerated, according to which method a gas is sent through a first amount of this desiccant, while a portion of the dried gas is sent through a second amount of already used desiccant for regenerating it, this gas portion for the regeneration being heated and after having taken up moisture is evacuated, whereby, after regenerating the second amount of desiccant, the gas flow is inverted so that the gas to be dried is sent through the regenerated second amount of desiccant, while a portion of the dried gas is now sent through the first amount for regenerating, in which the gas portion used for the regeneration is heated in at least two successive steps, said steps being performed in different zones situated successively in the flow direction of the gas portion through the regenerating desiccant and by stopping the heating in one of said zones as soon as the desiccant in this zone is regenerated, so that this zone may already cool down by the gas portion for regeneration while a successive of said zones is still regenerated by the heated gas.

2. The method of claim 1, in which during the regeneration, heating of the gas occurs by means of microwaves.

3. A device for drying gas by adsorption, comprising an inlet pipe for the wet gas, an outlet pipe for the dried gas and between them at least two vessels mounted in parallel filled with a desiccant able to be regenerated, means for connecting the inlet pipe alternately with the inlet of one of the vessels and the inlet of the other vessel for drying the wet gas, means for returning a portion of the dried gas to the vessel which is not connected to the inlet pipe, for the regeneration of the desiccant and heating means in both vessels, said heating means comprising at least two heating elements which are situated successively in different zones in the flow direction of the gas through the vessel and which can be switched in or off separately, in which the device comprises means for measuring directly or indirectly the moisture content in each zone and a control device connected to said means for commanding the heating elements individually in function of the moisture contents measured by said means for measuring.

4. The device of claim 3, in which the vessels are divided in more than two zones which can be heated by means of a heating element.

5. The device of claim 3, in which the heating elements are microwave sources.

6. The device of claim 5, in which the vessels are separated in at least two zones by means of at least one perforated screen.

7. The device of claim 6, in which the screen is conical.

8. The device of claim 7, in which each screen is provided with an opening at its top and with at least one slot at its lower edge.

9. The device of claim 8, in which each vessel comprises at least one filling plug at its top and at least one emptying plug at its bottom.

* * * * *